UNITED STATES PATENT OFFICE.

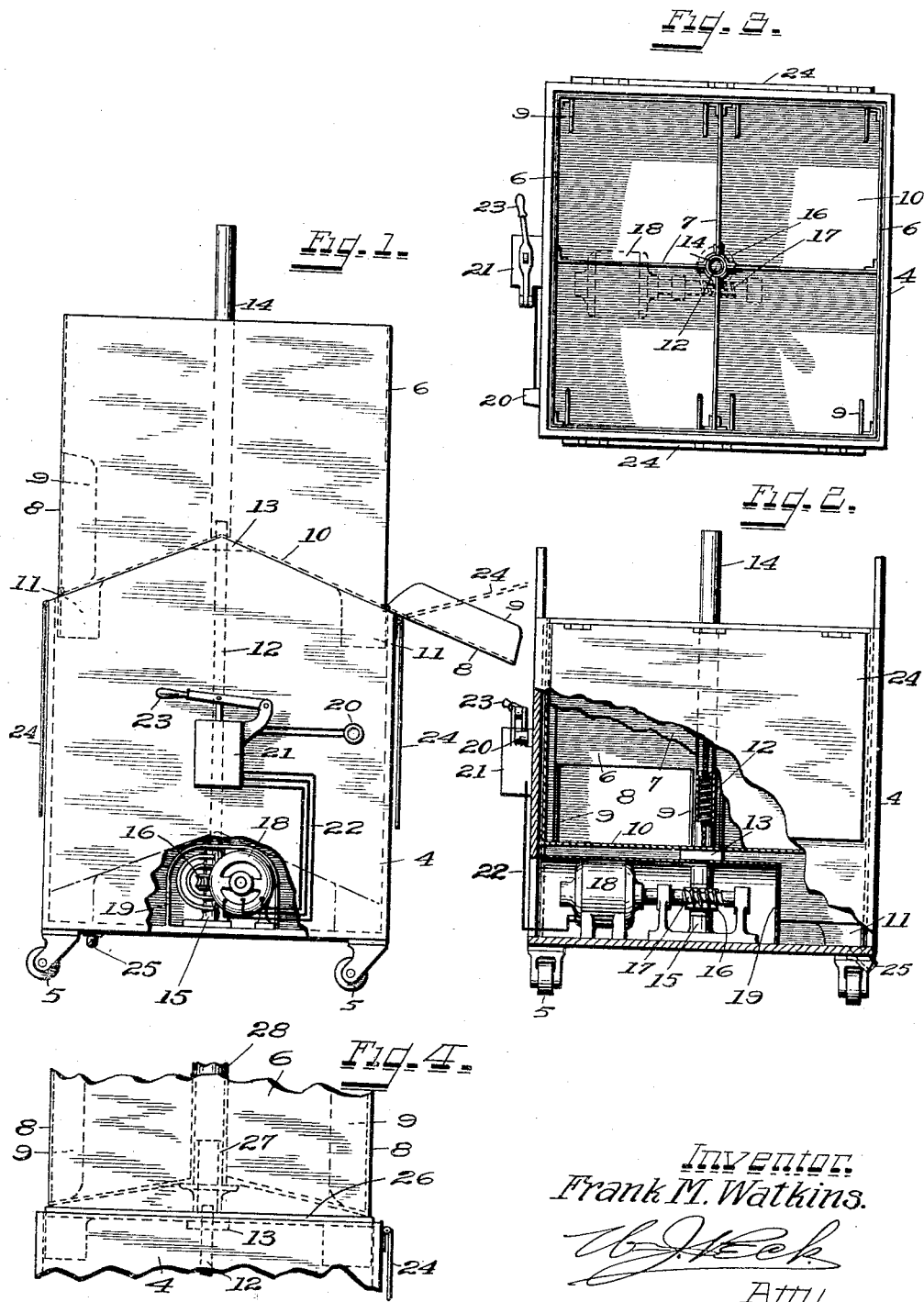

FRANK M. WATKINS, OF CINCINNATI, OHIO.

LAUNDRY-TRUCK.

1,330,927.      Specification of Letters Patent.     Patented Feb. 17, 1920.

Application filed November 20, 1918. Serial No. 263,410.

*To all whom it may concern:*

Be it known that I, FRANK M. WATKINS, a citizen of the United States, and a resident of Cincinnati, in the county of Hamilton and State of Ohio, have invented certain new and useful Improvements in Laundry-Trucks, of which the following is a full, clear, and exact description, reference being had to the accompanying drawing, forming part of this specification.

My invention relates more particularly to trucks for use in laundries where large quantities of clothes or other goods are handled and wherein it is desired to provide means for easy and rapid loading and unloading of the truck.

One object of my invention is the provision of means whereby, when it is desired to load the truck, the loading may be accomplished easily and articles of various kinds may be kept in groups.

Another object of my invention is the provision of means whereby, when it is desired to unload the truck, the unloading may be accomplished by elevating the load thus saving the operator the amount of energy necessary to accomplish this result.

Another object of my invention is the provision of simple and efficient mechanism for moving and controlling the movement of the load elevating means.

Other objects of my invention will appear and be described in this specification.

The novelty of my invention will be hereinafter more fully set forth and specifically pointed out in the claims.

In the accompanying drawing Figure 1 is a side elevation of a truck embodying my invention with the load carrying compartment elevated to unloading position.

Fig. 2 is a front elevation of the truck partly in section and partly broken away, showing the load carrying compartment lowered to loading or transporting position.

Fig. 3 is a plan view of Fig. 2.

Fig. 4 is a side elevation partly broken away showing a modified form of construction.

The same numerals of reference are used to indicate identical parts in all the figures.

For purposes of illustration and to show one form of structure in which my invention may be embodied, I have shown the truck composed of the main frame or housing 4 mounted upon suitable caster wheels 5.

The frame or body portion 4 consists of four side walls and bottom forming a housing for the load carrying receptacle 6 which is preferably formed of sheet metal and divided into compartments by means of the partitions 7 (Fig. 3), and provided with load discharging doors 8 which are hinged at their lower edge to the lower portion of the load carrying compartment and are provided with side flanges 9 arranged in such manner that when the doors 8 are open as shown to the right of Fig. 1, these doors form chutes by means of which the load may be transferred from the truck to the centrifugal wringer or other laundry machine.

The bottom of the load carrying receptacle 6 is preferably slanted downwardly from the center as shown at 10 Fig. 1 to assist in discharging the load, and to maintain the receptacle 6 in its proper position when elevated with relation to the main housing 4, guides 11 are attached to or form part of the lower portion of the load carrying receptacle 6 in such manner that when the receptacle is elevated as shown in Fig. 1, the guides 11 remain within the main housing 4 to assist in properly maintaining the load carrying receptacle 6 in position and also to guide it properly at the beginning of its downward movement within the main housing.

The guides 11 also serve as feet upon which the load carrying receptacle 6 rests when completely lowered within the main housing 4, the position of these parts as well as the bottom of the load carrying receptacle being shown by dot and dash lines in Fig. 1.

To raise the load carrying receptacle, I provide a centrally located elevating screw 12 and a nut 13 surrounds this screw and is mounted in the lower portion of the load carrying receptacle, and as a means of protecting the contents of the truck from coming in contact with the screw 12, I provide a tubular housing 14, which extends upwardly from the bottom of the load carrying receptacle which, in addition to protecting the contents of the truck from injury by the screw, also serves the purpose of maintaining lubricant for the screw.

The tubular housing 14 may be supported partly by the partitions 7 which may be secured to it thus forming a substantial structure.

The lower end of the screw 12 is mounted in suitable bearings 15 and is provided with a worm wheel 16, driven by a worm 17 mounted on the shaft of the motor 18, the motor and worm and wheel mechanism just described being preferably mounted in a water tight housing 19.

The motor 18 is preferably of such a type as may be operated from the ordinary electric light circuit and to that end I provide a socket 20 electrically connected to a reversing switch 21, from which the leads 22 extend to the motor, the reversing switch 21 being provided with a suitable operating handle 23 by means of which the motor may be started or stopped or operated in either direction at the will of the operator.

To assist in the loading of the truck aprons 24 are hingedly attached to the sides of the main housing 4 and are adapted to be raised to rest upon the edge of the machine from which the load is to be transferred to the truck, one of these aprons 24 being shown in raised position by the dotted lines of Fig. 1.

The main housing 4 is preferably water tight and is provided with a drain passage 25 by means of which any water which may accumulate in the truck may be permitted to escape by opening this outlet when the truck has been moved to a position over any suitable floor drain, the construction being such that during the operation of the truck from one machine to another the water which drains from the contents is kept within the truck and not permitted to flow upon the floor of the laundry.

The operation of the truck is as follows:

Assuming that it is desired to transfer a charge of clothes from a washing machine to a wringer.

The load carrying receptacle of the truck is lowered to the position shown in Fig. 2 and the truck is moved to the washing machine, one of the aprons 24 being raised to rest upon the edge of the washing machine and the load transferred across the apron to the compartments of the truck adjacent the washing machine. When these compartments have been filled, the position of the truck is reversed and the other apron is raised and the balance of the load transferred to the truck whereupon the truck is moved to the wringer, a light cord is attached to the socket 20 and the load is elevated to the position shown in Fig. 1 whereupon the doors 8 adjacent the wringer are opened and the load on that side of the truck transferred to the wringer after which the position of the truck is reversed and the balance of the load transferred, the doors 8 serving as chutes to properly convey the load to the wringer.

The doors 8 are then closed and the load carrying receptacle lowered after which the light cord is detached and the truck either moved to the drain board and its accumulated water permitted to escape or moved again to another machine and recharged.

It will be noted that articles of like kind may be kept in separate groups within the compartments of the truck and discharged into separate wringers or into separate compartments of a wringer depending on the equipment of the particular laundry employing the truck.

While I have shown the truck equipped with an electric motor for operating the elevating screw, it is evident that other form of motive power may be used without departing from the spirit of my invention, such as a hydraulic motor or, in cases where it is desired to construct the truck cheaply, a hand operated mechanism could be provided for raising the load carrying receptacle 6.

From the modification shown in Fig. 4, to avoid the necessity of turning the truck around for unloading all of its compartments, the sides of the body portion 4 may be brought to a common level and the elevating nut 13 may be mounted on the lower portion of a turn table 26 which may be provided with an upwardly extending tubular stem 27 by means of which the load carrying receptacle 6 may be maintained in central position, the load carrying receptacle being provided with a housing 28 similar to the housing 14, the extension 27 fitting within the lower portion of this housing.

In construction such as shown in Fig. 4 the body portion of the truck may be provided with but one of the aprons 24, it being obvious that when the load carrying receptacle is elevated as shown, and the apron 24 placed to rest upon a machine, that portion of the load toward the apron may be removed from the load carrying receptacle, whereupon the receptacle may be partly rotated to bring a loaded portion thereof into a position for unloading after which the load carrying receptacle may be moved until it bears the proper relation to the housing 4 whereupon it may be lowered thereinto.

It will also be apparent that the truck may assume any outside form desired, the housing and load carrying receptacle being cylindrical and telescoping one within the other or these parts may be made with any desired number of sides without departing from the spirit of my invention.

Having thus fully described my invention, I claim:

1. In a truck the combination of a main housing, a load carrying receptacle mounted therein, load discharging doors in said load carrying receptacle and held in closed position by said housing, and means for moving the load carrying receptacle to discharging position.

2. In a truck the combination of a main housing, a load carrying receptacle mounted therein, a load discharging door in said receptacle and held in closed position by said housing, an elevating screw for raising or lowering said load carrying receptacle, and means for rotating said screw in either direction.

3. In a truck the combination of a main housing, a load carrying receptacle mounted therein, an elevating screw rotatably mounted between said main housing and said load carrying receptacle to move the latter, a housing carried by the load carrying receptacle and surrounding said screw, a load discharging door in said receptacle and held in closed position by said housing, and means for causing the rotation of said screw in either direction.

4. In a truck the combination of a main housing, hinged aprons attached thereto, a load carrying receptacle mounted in said housing, a partition in said load carrying receptacle, load discharging doors from the compartments of the load carrying receptacle and means for elevating said load carrying receptacle to permit the opening of the load discharging doors.

5. In a truck the combination of a main housing, a loading apron carried thereby, a load carrying receptacle mounted therein, a load discharging door in said receptacle, and means for moving the load carrying receptacle to discharging position.

6. In a truck the combination of a main housing, a load carrying receptacle mounted therein, an elevating screw rotatably mounted between said housing and said load carrying receptacle to move the latter, a stationary housing carried by the load carrying receptacle and surrounding said screw, means for causing the rotation of said screw in either direction, and hinged aprons attached to said housing whereby the contents of the truck may be transferred to or from the same.

7. In a laundry truck the combination of a housing provided with transporting wheels, a load carrying receptacle, an elevating device carried by the housing for raising and lowering the receptacle, loading aprons carried by the housing for use in connection with the receptacle when the latter is lowered in the housing, and load discharging doors carried by the receptacle and for discharging the load when the receptacle is raised.

8. In a laundry truck the combination of a housing provided with transporting wheels, a load carrying receptacle, an elevating device for raising and lowering the receptacle with relation to the housing, loading aprons carried by the housing for the use when the receptacle is lowered, load discharging doors carried by the receptacle and held in closed position by the housing when the receptacle is lowered and through which the contents of the receptacle may be discharged when the receptacle is raised.

FRANK M. WATKINS.